United States Patent
Maslov et al.

(10) Patent No.: US 7,436,139 B2
(45) Date of Patent: Oct. 14, 2008

(54) PHASE ADVANCE ANGLE OPTIMIZATION FOR BRUSHLESS MOTOR CONTROL

(75) Inventors: Boris A. Maslov, Reston, VA (US); Matthew G. Feemster, Severna Park, MD (US); Guohui Yuan, Greenbelt, MD (US)

(73) Assignee: Matra Manufacturing & Services SAS, Elancourt (FR)

( * ) Notice: Subject to any disclaimer, the term of this patent is extended or adjusted under 35 U.S.C. 154(b) by 0 days.

(21) Appl. No.: 10/353,067

(22) Filed: Jan. 29, 2003

(65) Prior Publication Data

US 2004/0145330 A1 Jul. 29, 2004

(51) Int. Cl.
H02K 23/02 (2006.01)

(52) U.S. Cl. ............. 318/437; 318/400.01; 318/400.07; 318/400.09; 318/400.14; 318/400.15

(58) Field of Classification Search ................. 318/437, 318/254, 439, 430, 432, 599, 721, 400.01, 318/400.07, 400.09, 400.14, 400.15
See application file for complete search history.

(56) References Cited

U.S. PATENT DOCUMENTS

| | | | | |
|---|---|---|---|---|
| 3,908,130 A | * | 9/1975 | Lafuze | 290/46 |
| 3,937,974 A | * | 2/1976 | Lafuze | 290/46 |
| 4,392,418 A | * | 7/1983 | Jimenez | 99/330 |
| 4,959,596 A | * | 9/1990 | MacMinn et al. | 318/254.2 |
| 5,113,125 A | * | 5/1992 | Stacey | 318/721 |
| 6,373,211 B1 | * | 4/2002 | Henry et al. | 318/432 |
| 6,384,496 B1 | | 5/2002 | Maslov et al. | 310/68 B |
| 6,605,912 B1 | * | 8/2003 | Bharadwaj et al. | 318/439 |
| 6,657,413 B2 | | 12/2003 | Nakatsugawa et al. | |
| 6,694,287 B2 | * | 2/2004 | Mir et al. | 702/183 |
| 6,788,021 B2 | * | 9/2004 | Sozer et al. | 318/701 |
| 2002/0105335 A1 | * | 8/2002 | Mir et al. | 324/503 |
| 2003/0062868 A1 | * | 4/2003 | Mir et al. | 318/599 |

FOREIGN PATENT DOCUMENTS

| | | |
|---|---|---|
| JP | 6284782 | 10/1994 |
| JP | 2001-128490 A | 5/2001 |
| JP | 2002360000 | 12/2002 |
| WO | WO 01/20751 A2 | 3/2001 |
| WO | WO 01/80414 A | 10/2001 |

* cited by examiner

*Primary Examiner*—Rita Leykin
(74) *Attorney, Agent, or Firm*—Marshall, Gerstein & Borun LLP

(57) ABSTRACT

A control system for a multiphase permanent magnet motor having a controller for producing a control signal to energize each phase winding. The controller includes a current value calculator for determining a value of phase current advanced in phase with respect to back-EMF by a phase advance angle, and a phase advance optimization circuit for producing a value of the phase advance angle optimized so as to maximize output torque of the motor and mimimize the phase current. The phase advance optimization circuit determines the phase advance angle optimized for each phase of the motor.

33 Claims, 12 Drawing Sheets

PHASE ADVANCE ANGLE OPTIMIZATION FOR BRUSHLESS MOTOR CONTROL

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,102, of Maslov et al., filed Oct. 1, 2001, U.S. application Ser. No. 09/993,596 of Pyntikov et al., filed Nov. 27, 2001, and U.S. application Ser. No. 10/173,610 of Maslov et al., filed Jun. 19, 2002, all commonly assigned with the present application. The disclosures of these applications are incorporated by reference herein.

FIELD OF THE INVENTION

The present invention relates to rotary electric motors, and more particularly to phase advance angle optimization for controlling brushless permanent magnet motors.

BACKGROUND

The above-identified copending patent applications describe the challenges of developing efficient electric motor drives. Electronically controlled pulsed energization of windings of motors offers the prospect of more flexible management of motor characteristics. By control of pulse width, duty cycle, and switched application of an energy source to appropriate stator windings, greater functional versatility can be achieved. The use of permanent magnets in conjunction with such windings is advantageous in limiting current consumption.

In a vehicle drive environment, it is highly desirable to attain smooth operation over a wide speed range, while maintaining a high torque output capability at minimum power consumption. Motor structural arrangements described in the copending applications contribute to these objectives. Electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects with other electromagnet members.

Precision controlled performance within brushless motor applications involves the fusion of nonlinear feedforward compensation coupled with current feedback elements. However, feedforward compensation expressions typically rely heavily upon various circuit parameters, such as phase resistance, phase self-inductance and the like, which are depicted illustratively in the equivalent circuit diagram for an individual motor phase in FIG. 1. $V_i(t)$ denotes the per-phase voltage input, $R_1$ denotes the per-phase winding resistance, and $L_i$ represents the per-phase self-inductance. $E_i(t)$ represents the opposing back-EMF voltage of the motor per phase and can be approximated by the following expression:

$$E_i = (K_{ei}\omega)\sin(N_r\theta_i)$$

where $K_{ei}$ denotes the per-phase back-EMF coefficient, $\omega(t)$ represents the rotor velocity, $N_r$ denotes the number of permanent magnet pairs, and $\theta_i(t)$ represents the relative displacement between the $i^{th}$ phase winding and a rotor reference position.

The voltage $V_i(t)$ may be defined as follows:

$$V_i(t) = E_i(t) + R_i I_i(t) + L_i \frac{d}{dt} I_i(t) \quad i = 1, 2, \ldots, N_s$$

where
  $V_i(t)$ is the voltage across the winding;
  $I_i(t)$ is the phase current;
  $R_i$ is the winding resistance;
  $E_i(t)$ is the back-EMF;
  $L_i$ is the winding self-inductance; and
  $N_S$ is the number of stator phase windings.

The voltage $V_i(t)$ is supplied by a regulated DC power source with a limited voltage. Since the back-EMF term is proportional to motor speed, there is a limit for the phase current $I_i(t)$ above certain speeds.

Assuming that the magnetic flux distribution in the air gap is sinusoidal, the steady-state behaviors of the back-EMF and phase current may be defined as follows:

$$E_i(t) = E_i \sin(\theta_i(t)) = K_{e,i}\omega \sin(N_r\omega t + \Delta_i)$$
$$I_i(t) = I_i \sin(\theta_i(t)) = I_i \sin(N_r\omega t + \Delta_i) \quad i = 1, 2, \ldots, N_S$$

and the average total torque is $$\overline{T} = \frac{1}{2}\sum_{i=1}^{N_s} K_{\tau i} I_i$$

where
  $N_r$ is the number of PM pole pairs;
  $K_{ei}$ is the back-EMF coefficient;
  $\omega$ is the motor speed;
  $\Delta_i$ is an offset angle that depends on motor geometry;
  $T$ is the total average torque output; and
  $K_{ei}$ is the torque coefficient.

Hence, the torque output is also limited by power supply constraints. A phase advance control technique has been used to extend speed range operation limited by the maximum power supply voltage. Instead of forming a sinusoidal armature current (or phase current) in phase with the back-EMF, the phase angle of the armature current is advanced with respect to the back-EMF.

For example, U.S. Pat No. 6,373,211 to Henry et al. describes a method for extending speed range operation for a sinusoidally excited permanent magnet motor. The method utilizes the phase advance technique to achieve an extended speed range of operation at reduced phase current. The extended speed range is provided by controlling the phase advance angle a between the current vector and the back-EMF vector. A set of pre-computed tables is used to store different torque values at different speeds. The current phase advance angle is calculated based upon the torque command and sensed speed.

However, the Henry et al. technique does not produce the values of phase advance angle optimized to achieve the maximum torque output with the minimum phase current. Instead, the patent discloses setting the maximum torque $T_{max}$. Thereafter, the speed $\omega$ and the required or command torque $T_{cmd}$ are read. If the command torque $T_{cmd}$ is greater than the maximum torque $T_{max}$ available at that speed $\omega$, then the command torque $T_{cmd}$ is reduced. The phase advance angle is calculated for that reduced value of the command torque $T_{cmd}$.

Hence, the prior art phase advance technique provides the phase advance angle for achieving an extended speed range of operation at reduced phase current. However, the prior art does not teach optimizing the phase advance angle and the amplitude of phase current to minimize power consumption.

In a vehicle drive environment, wherein power availability is limited to an on-board supply, it is highly desirable to attain a high torque output capability at minimum power consumption. Motor structural arrangements described in the copending applications contribute to these objectives. As described in those applications, electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects occurring from interaction with other electromagnet members.

Hence, the need exists for phase advance optimization to enable a motor to deliver increased torque output at minimum power consumption.

Moreover, a conventional phase advance technique does not provide phase advance optimization for each phase of a multiphase motor. However, due to phenomena affected by mechanical/manufacturing tolerances and other structural characteristics, each motor phase will exhibit a range of values for each circuit element. Factors that can affect the magnitudes of the circuit parameters include: the net flux linkage of the electromagnet core; fluctuations in the inductance of the core with respect to the electrical circuit; variations in the resistance of the phase winding due to changes in manufacturing tolerances such as the cross sectional area and winding tension; variations in the permeability of the core (related to the grade and the processing and finishing history of the material); phase winding technique (uniform or scrambled wound) or the build quality of the coils on each stator core; position of the electromagnet and permanent magnet interaction (i.e., permeance of the magnetic circuit); variations in the air gap flux density, which is dependent on the permanent magnet rotor magnet sub assembly; residual magnetic flux density; biasing magnetic field due to external magnetic fields; shape of coil wire (rectangular, circular or helical); winding factor achieved in the coil; manufacturing tolerances achieved in the core geometry which could alter the cross sectional tolerance of the core; the effective length over which the coil is wound.

Typically, motor control strategies assume uniformity of parameter values over the entire motor. One median parameter value is taken to represent all corresponding circuit elements of the motor. This lumped parameter approach often leads to degradation in tracking performance due to over/under compensation of the control strategy due to parameter value mismatch within individual phase compensation routines. Such assumed parameters are prone to even greater discrepancies with stator structures configured as autonomous ferromagnetically isolated core components.

Thus, the need exists for a phase advance optimization technique that produces the optimum phase advance angle and optimum amplitude of phase current to maximize the motor output torque at minimum power consumption, and accounts for the parameter variations in the separate phase windings and stator phase component structures.

DISCLOSURE OF THE INVENTION

The present invention fulfills this need, while maintaining the benefits of the separated and ferromagnetically isolated individual stator core element configurations such as disclosed in the copending applications. The ability of the present invention to implement a phase advance angle optimization strategy that maximizes output torque and minimize phase current for individual phase circuit elements offers an optimal torque control strategy for a particular user's requested torque with a higher degree of precision controllability since each phase control loop is closely matched with its corresponding winding and structure. This ability is obtained, at least in part, by establishing in a control system for a multiphase permanent magnet motor a controller for producing a control signal to energize the phase winding including a current value calculator for determining a value of phase current advanced in phase with respect to back-EMF by a phase advance angle, and a phase advance optimization circuit for producing a value of the phase advance angle optimized so as to maximize output torque of the motor and mimimize the phase current.

Based on phase-dependent parameters including reactance of the winding, torque coefficient and a phase-dependent back-EMF associated with each phase, the phase advance optimization process may be performed for each phase of the motor to account for the parameter variations in the separate phase windings and stator phase component structures. The controller may operate in an integrated execution scheme in which particular phase parameters are substituted for each generated control voltage output. Alternatively, the controller may be provided with a separate control loop for each stator phase. Each phase loop configuration utilizes an optimum value of the phase advance angle for a particular phase to generate the control signal for the respective phase winding.

The phase advance optimization circuit may comprise a first optimization section for determining a maximum torque value for a given speed, and a second optimization section responsive to the maximum torque value for producing an optimum value of the phase advance angle and an optimum amplitude of the phase current. The second optimization section minimizes the phase current for a given speed and user requested torque.

In accordance with a method of the present invention, the following steps are carried out to provide real-time continuous control of a multi-phase permanent magnet motor:

inputting a torque command signal representing desired torque, determining phase current required to achieve the desired torque, based on the phase current, determining control voltage required to energize each winding in order to obtain the desired torque, advancing phase of the phase current with respect to back-EMF by a phase advance angle if the required control voltage exceeds power supply voltage, and based on the desired torque, determining phase advance angle optimized to maximize output torque of the motor and minimize the phase current.

The optimum phase advance angle may be determined using a look-up table responsive to the desired torque and motor speed.

The motor control of the present invention provides advantages with motors of a variety of construction and can be applied to a motor in which each stator phase component comprises a ferromagnetically isolated stator electromagnet, the electromagnet core elements being separated from direct contact with each other and formed with separate phase windings.

The present invention is particularly advantageous in applications in which the motor is intended to track a variable user initiated input, such as electric vehicle traction control operation. In response to torque command input signals, per-phase desired current trajectories are selected by the controller in accordance with an expression that includes the particular parameters for each phase.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 2:
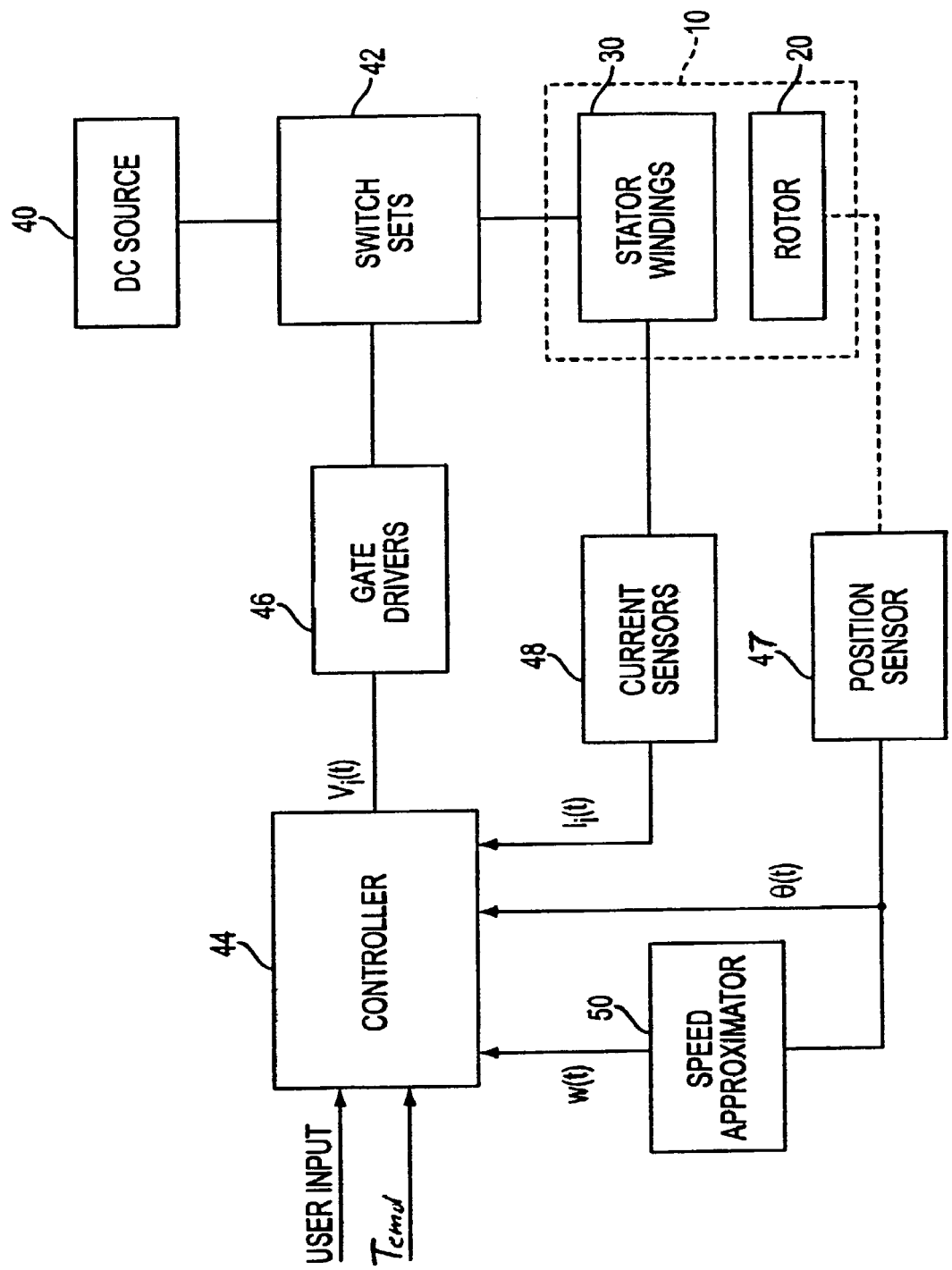
FIG. 2 is a block diagram of a motor control system in accordance with the present invention.

FIG. 2 is a block diagram of a motor control system in accordance with the present invention. Multiphase motor 10 comprises rotor 20 and stator 30. The stator has a plurality of phase windings that are switchably energized by driving current supplied from DC power source 40 via electronic switch sets 42. The switch sets are coupled to controller 44 via gate drivers 46. Controller 44 has one or more user inputs and a plurality of inputs for motor conditions sensed during operation. Current in each phase winding is sensed by a respective one of a plurality of current sensors 48 whose outputs are provided to controller 44. The controller may have a plurality of inputs for this purpose or, in the alternative, signals from the current sensors may be multiplexed and connected to a single controller input. Rotor position sensor 47 is connected to another input of controller 44 to provide position signals thereto. The output of the position sensor is also applied to speed approximator 50, which converts the position signals to speed signals to be applied to another input of controller 44.

The sequence controller may comprise a microprocessor or equivalent microcontroller, such as Texas Instrument digital signal processor TMS320LF2407APG. The switch sets may comprise a plurality of MOSFET H-Bridges, such as International Rectifier IRFIZ48N-ND. The gate driver may comprise Intersil MOSFET gate driver HIP4082IB. The position sensor may comprise any known sensing means, such as a Hall effect devices (Allegro Microsystems 92B5308), giant magneto resistive (GMR) sensors, capacitive rotary sensors, reed switches, pulse wire sensors including amorphous sensors, resolvers, optical sensors and the like. Hall effect current sensors, such as F. W. Bell SM-15, may be utilized for currents sensors 48. The speed detector 50 provides an approximation of the time derivative of the sensed angular position signals.

Figure 3:
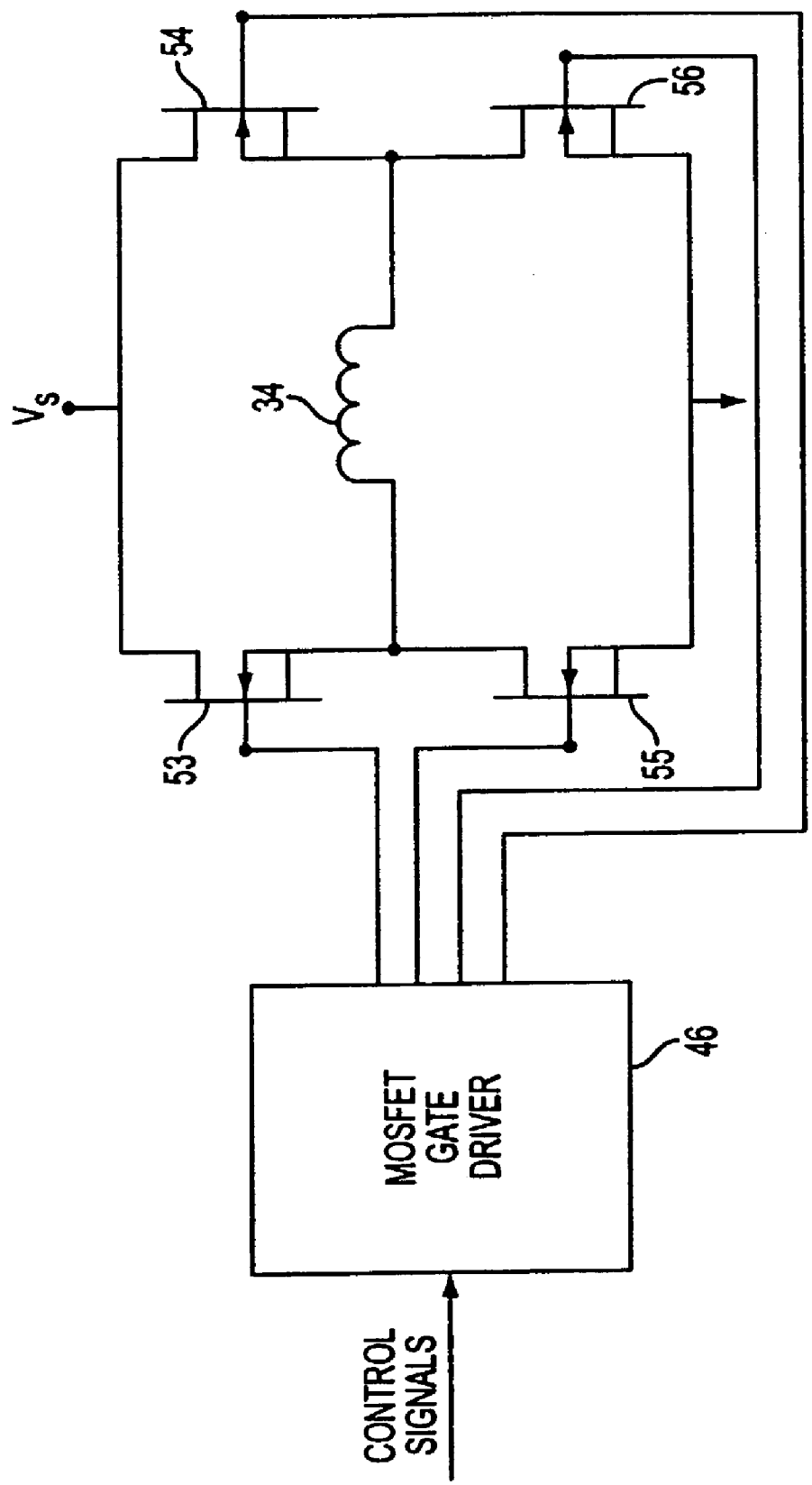
FIG. 3 is a partial circuit diagram of a switch set and driver for an individual stator core segment winding of a motor controlled by the system of FIG. 2.

FIG. 3 is a partial circuit diagram of a switch set and driver for an individual stator core segment winding. Stator phase winding 34 is connected in a bridge circuit of four FETs. It is to be understood that any of various known electronic switching elements may be used for directing driving current in the appropriate direction to stator winding 34 such as, for example, bipolar transistors. FET 53 and FET 55 are connected in series across the power source, as are FET 54 and FET 56. Stator winding 34 is connected between the connection nodes of the two series FET circuits. Gate driver 46 is responsive to control signals received from the sequence controller 44 to apply activation signals to the gate terminals of the FETs. FETs 53 and 56 are concurrently activated for motor current flow in one direction. For current flow in the reverse direction, FETs 54 and 55 are concurrently activated. Gate driver 46 alternatively may be integrated in sequence controller 44.

Figure 4:
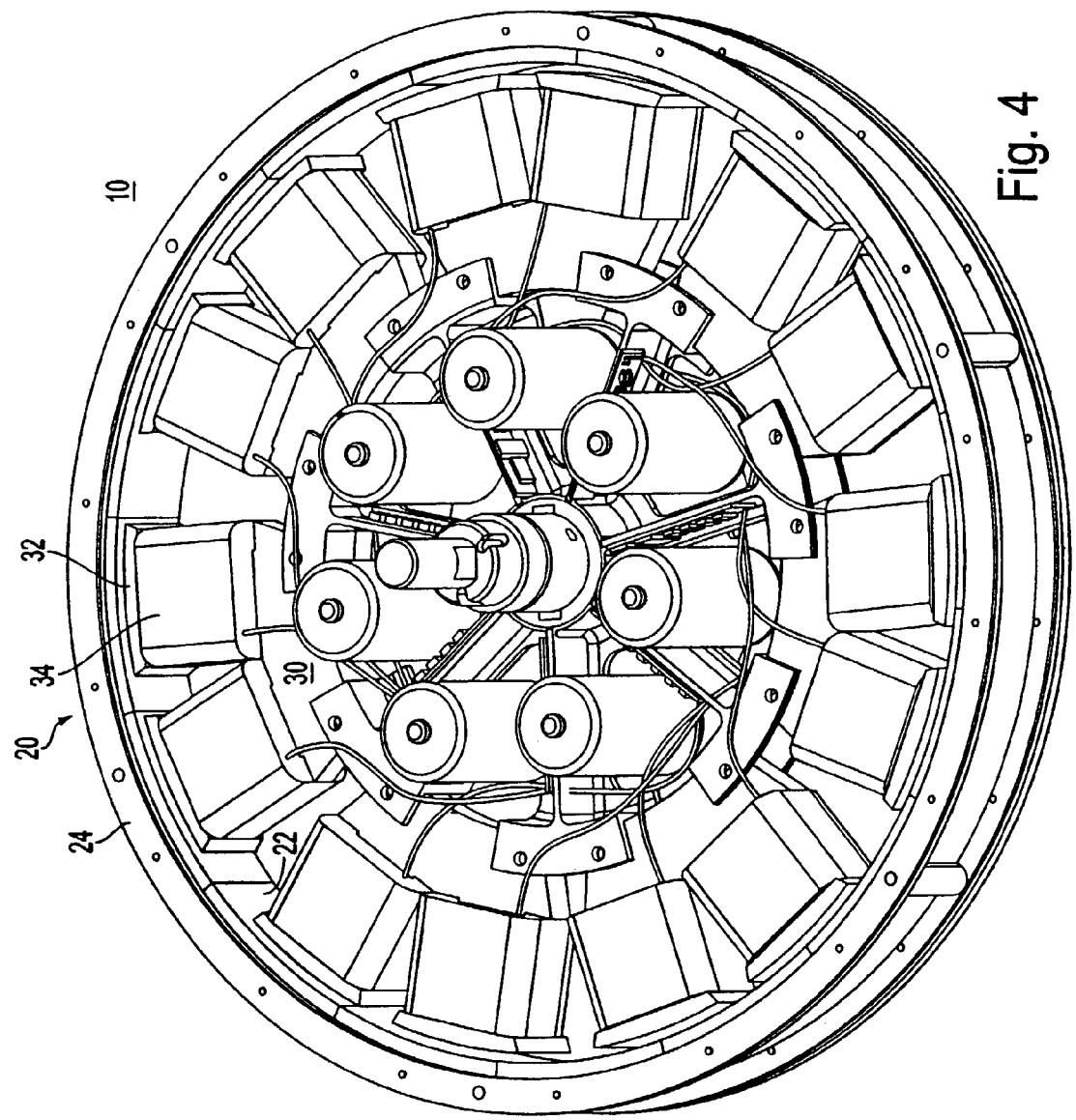
FIG. 4 is a three-dimensional cutaway drawing of motor structure suitable for use in the control system of FIG. 2.

The motor of the present invention is suitable, for example, for use in driving a vehicle wheel of an automobile, motorcycle, bicycle, or the like. FIG. 4 is a cutaway drawing of the motor structure that can be housed within a vehicle wheel, the stator rigidly mounted to a stationary shaft and surrounded by a rotor for driving the wheel. The motor 10 comprises annular permanent magnet rotor 20 separated from the stator by a radial air gap. The rotor and stator are configured coaxially about an axis of rotation, which is centered in the stationary shaft. The stator comprises a plurality of ferromagnetically isolated elements, or stator groups. Core segments 32, made of magnetically permeable material separated from direct contact with each other, have respective winding portions 34 formed on each pole. In this example, seven stator groups are shown, each group comprised of two salient electromagnet poles allocated circumferentially along the air gap. The rotor comprises a plurality of permanent magnets 22, circumferentially distributed about the air gap and affixed to an annular back plate 24. Reference is made to the Maslov et al. application Ser. No. 09/966,102, discussed above, for a more detailed discussion of a motor embodying this construction. It should be appreciated, however, that the vehicle context is merely exemplary of a multitude of particular applications in which the motor of the present invention may be employed. The concepts of the invention, more fully described below, are also applicable to other permanent magnet motor structures, including a unitary stator core that supports all of the phase windings.

In the vehicle drive application example, one of the user inputs to the controller represents required torque indicated by the user's throttle command. An increase in throttle is indicative of a command to increase speed, which is realized by an increase in torque. Another external input to the controller processor may include a brake signal that is generated when the driver operates a brake pedal or handle. The processor may respond by immediately deactivating the motor drive or, instead, vary the drive control to reduce torque and speed. A separate external deactivation signal can be applied to immediately respond to the driver's command.

The control system torque tracking functionality should maintain steady state operation for a constant input command through varying external conditions, such as changes in driving conditions, road gradient, terrain, etc. The control system should be responsive to the driver's throttle input to accurately and smoothly accommodate changes in torque commands.

A control voltage $V_i(t)$ at the output of the controller 44 represents a calculated voltage value required to obtain the user's requested torque. As the control voltage $V_i(t)$ is supplied by a DC power source, the maximum value of the control voltage is limited by the maximum voltage of the DC power supply. If the calculated control voltage required to achieve the user's requested torque is greater than the maximum power supply voltage, the phase advance control technique is used to maximize the output torque of the motor. Instead of prescribing a sinusoidal phase current to be in phase with the back-EMF, as is done conventionally, the phase angle of the phase current is intentionally advanced with respect to the back-EMF by a phase advance angle to maximize the output torque.

Figure 5:
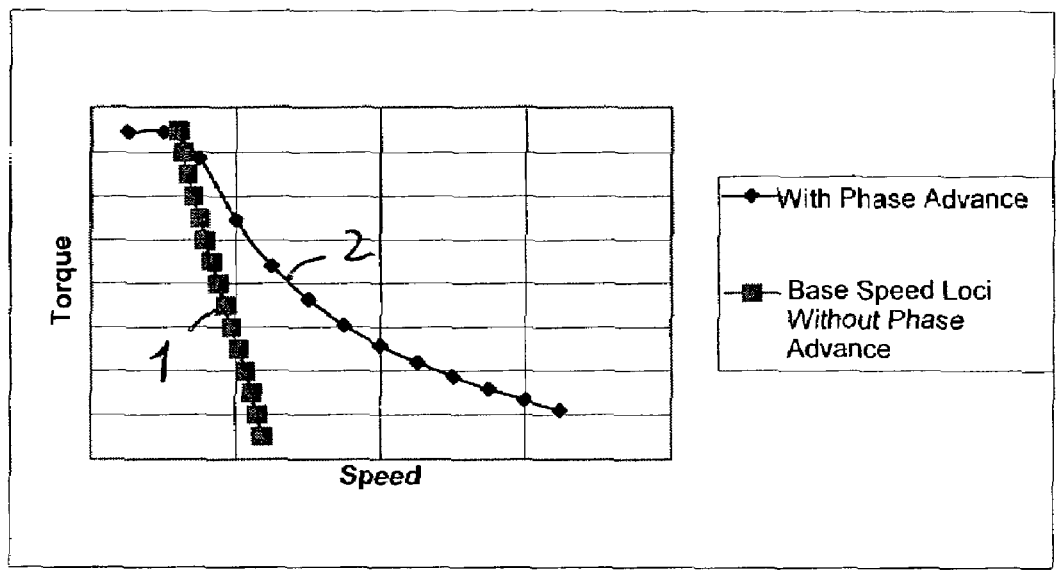
FIG. 5 is a diagram illustrating torque-speed characteristics with and without phase advance angle.

A diagram in FIG. 5 illustrates torque-speed characteristics of the motor 10 with and without phase advance angle. Curve 1 represents maximum torque values achievable at different speeds without advancing the phase of the phase current. This curve defines the base speed loci of the motor. Any operating point to the right and above this curve is not achievable unless phase advance angle is introduced.

Curve 2 represents maximum torque values achievable at various speeds using appropriate selection of the phase advance angle. As clear from FIG. 5, the operating range of the motor is extended well beyond the base speeds.

Figure 6:
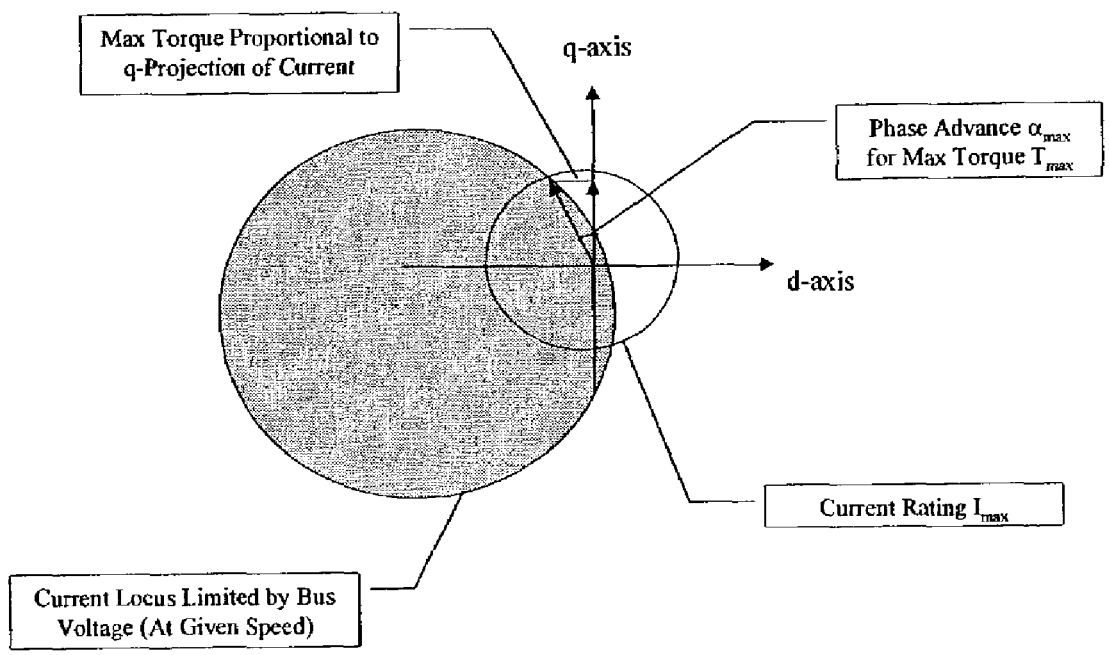
FIG. 6 is a circle diagram illustrating the phase advance technique in accordance with the present invention.

The phase advance technique is illustrated geometrically in a circle diagram shown in FIG. 6. The shaded circle 1 represents the current operating space available for the given speed, limited due to the limited DC power supply voltage. The smaller circle 2 depicts a current operating space limited by the maximum current rating $I_{max}$ of the motor. The actual steady-state current occurs within the overlapping area of the two circles.

The advance phase angle value value $\alpha_{max}$ which is represented in FIG. 6 by an angle between the current vector having length equal to the radius of the circle 2, and axis q formed along the back-EMF direction, corresponds to the phase advance angle providing the maximum torque $T_{max}$ proportional to the projection of the current vector on the axis q.

Figure 7:
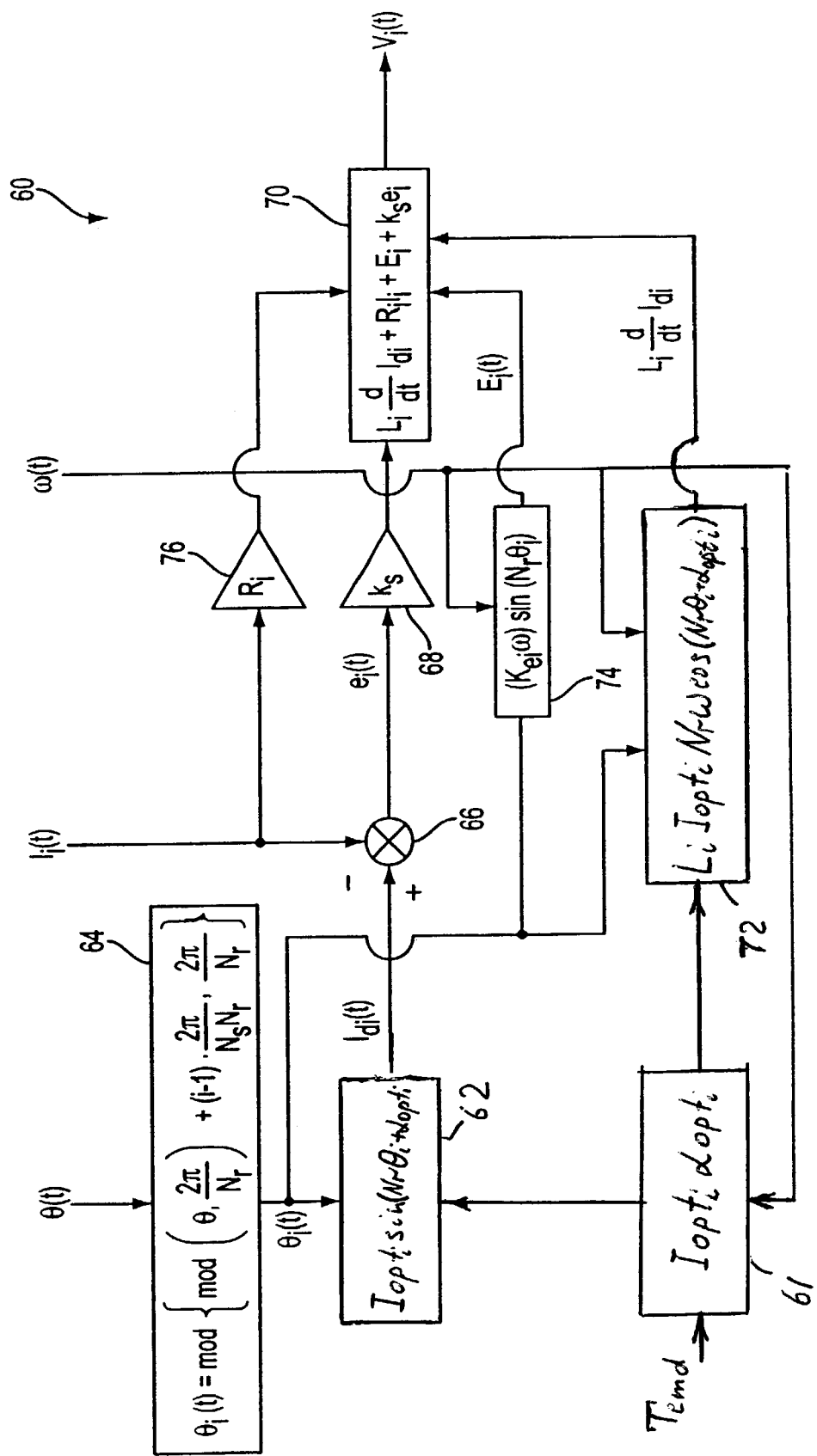
FIG. 7 is a block diagram that illustrates torque controller methodology for use in the control system of FIG. 2.

FIG. 7 is a block diagram that illustrates torque controller methodology using feedforward compensation expressions that take into account sensed motor operation conditions as well as individual circuit parameter values to obtain these objectives. For precision torque tracking, the per-phase desired current trajectories are selected according to the following expression:

$$I_{di}(t)=I_{opti}\sin(N_r\theta_i+\alpha_{opti}),$$

where $I_{di}$ denotes per-phase desired current trajectory, $I_{opti}$ is per-phase optimal current amplitude, $N_r$ is the number of permanent magnet pole pairs, $\theta_i$ represents relative positional displacement between the $i^{th}$ phase winding and a rotor reference point, and $\alpha_{opti}$ is per-phase optimal phase advance angle.

In order to develop the desired phase currents, the following per-phase voltage control expression is applied to the driver for the phase windings:

$$V_i(t)=L_i dI_{di}/dt+R_iI_i+E_i+k_Se_i$$

FIG. 7 represents the methodology, generally indicated by reference numeral 60, by which the controller derives the components of this voltage control expression in real time, utilizing the torque command input and the signals received from phase current sensors, position sensor and speed detector. The external user requested (desired) torque command $T_{cmd}$, responsive to the throttle, is input to phase advance angle optimization block 61 that determines per-phase optimal phase advance angle $\alpha_{opti}$ and per-phase optimal phase current amplitude $I_{opti}$ utilized in controller function block 62 to determine per-phase current $I_{di}(t)$ required to enable the motor to develop the user requested torque corresponding to the torque command $T_{cmd}$. Also, the phase advance angle optimization block 61 is fed with motor speed $\omega(t)$ supplied from the speed approximator 50. As discussed in more detail below, phase advance angle optimization block 61 may be implemented by a 2-dimensional look-up table provided in the controller 44 to determine the optimal phase advance angle $\alpha_{opti}$ and the optimal phase current amplitude $I_{opti}$ for each controller methodology 60, i.e. for each $i^{th}$ phase of the multiphase motor 10.

Rotor position $\theta$ is input to controller function block 64 that produces an output representing excitation angle $\theta_i(t)$ based on the rotor position, the number of permanent magnet pole pairs ($N_r$), the number of stator phases ($N_s$) and the phase delay of the particular phase. The output of controller function block 64 is fed to controller function block 62. Using the excitation angle input thus received, controller function block 62 determines per-phase current $I_{di}(t)$ required to enable the motor to develop the user requested torque corresponding to torque command $T_{cmd}$ as follows:

$$I_{di}(t)=I_{opti}\sin(N_r\theta_i+\alpha_{opti}).$$

Controller function block 66 calculates the difference between the desired phase current $I_{di}(t)$ received from block 62 and the sensed phase current $I_i(t)$ to output a phase current track error signal $e_i(t)$. This error signal is multiplied by gain factor $k_s$ in controller function block 68. The effect of the current feedback gain is to increase overall system robustness via the rejection of system disturbances due to measurement noise and any model parameter inaccuracies. The output of block 68 is fed to controller function block 70. Block 70 outputs time varying voltage signals $V_i(t)$ to the gate drivers 46 for the selective controlled energization of the phase windings 34. $V_i(t)$ has components that compensate for the effects of inductance, induced back-EMF and resistance.

To compensate for the presence of inductance within phase windings, the term $L_i dI_{di}/dt$, wherein $dI_{di}/dt$ denotes the standard time derivative of the desired phase current $I_{di}(t)$, is input to the controller function block 70 to be added in the phase voltage calculation. Determination of $L_i dI_{di}/dt$, is made at controller function block 72, acting upon the received inputs of $\alpha_{opti}$, $I_{opti}$, $\theta_i(t)$ and $\omega(t)$. Block 72 determines $LdI_{di}/dt=I_{opti}L_iN_r\omega\cos(N_r\theta_i+\alpha_{opti})$.

To compensate for the induced back-EMF voltage, the term $E_i$ is added in the phase voltage calculation as an input to function block 70 from controller function block 74. The back-EMF compensation value is derived from the rotor angle and speed, received as inputs to block 74 using back-EMF coefficient $K_{ei}$. To compensate for voltage drop attributed to phase winding resistance and parasitic resistance, the term $R_iI_i(t)$ is added in the phase voltage calculation as an input to function block 70 from controller function block 76.

Figure 8:
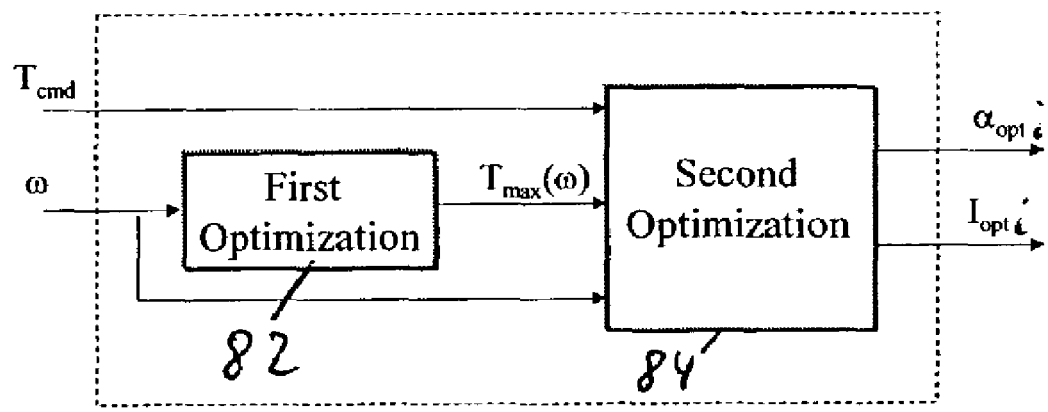
FIG. 8 is a block diagram illustrating the phase advance angle optimization block of FIG. 7.

FIG. 8 is a block diagram illustrating phase advance angle optimization block 61 that determines per-phase optimal phase advance angle $\alpha_{opti}$ and per-phase optimal phase current amplitude $I_{opti}$ utilized to determine per-phase current $I_{di}(t)$ required to enable the motor to develop the user's requested torque $T_{cmd}$. Phase advance angle optimization block 61 comprises first optimization section 82 for maximizing output torque and second optimization section 84 for minimizing phase current.

First optimization section 82 determines the maximum torque output $T_{max}(\omega)$ at present speed $\omega$ supplied as an input signal from the speed approximator 50. Optimization section 82 maximizes the torque output for a given speed, subject to the constraints of the maximum current rating $I_{max}$ of the motor and voltage $V_c$ of the DC power supply. In mathematical forms, it is given by the following:

Maximize $$\overline{T} = \frac{1}{2}\sum_{i=1}^{N_s} K_{T,i}I_i \cos\alpha_i \quad (1)$$

subject to $$(R_i^2 + X_{s,i}^2)I_i^2 - 2E_iX_{s,i}I_i \sin\alpha_i + 2E_iR_iI_i \cos\alpha_i + E_i^2 \leq V_c^2 \quad (2)$$

and $$I_i \leq I_{max} \quad (3)$$

$i=1,2,\ldots,N_s$ where $a_i$ is the phase advance angle
$X_{s,i} = L_iN_r\omega$ is the reactance of the winding
$I_{max}$ is the current rating of the motor During each control cycle, the controller 44 retrieves the rotor position signal from the position sensor 47. Then the amplitude and phase of the back-EMF is determined, assuming sinusoidal magnetic flux distribution in the air gap. These parameters are fed into the first optimization section 82, together with speed $\omega$, to determine the maximum achievable torque $T_{max}(\omega)$ at present speed $\omega$, based on the equations (1)-(3). Along with the user requested torque command $T_{cmd}$, the determined value of the maximum torque $T_{max}(\omega)$ is supplied to the second optimization section 84.

Figure 9:
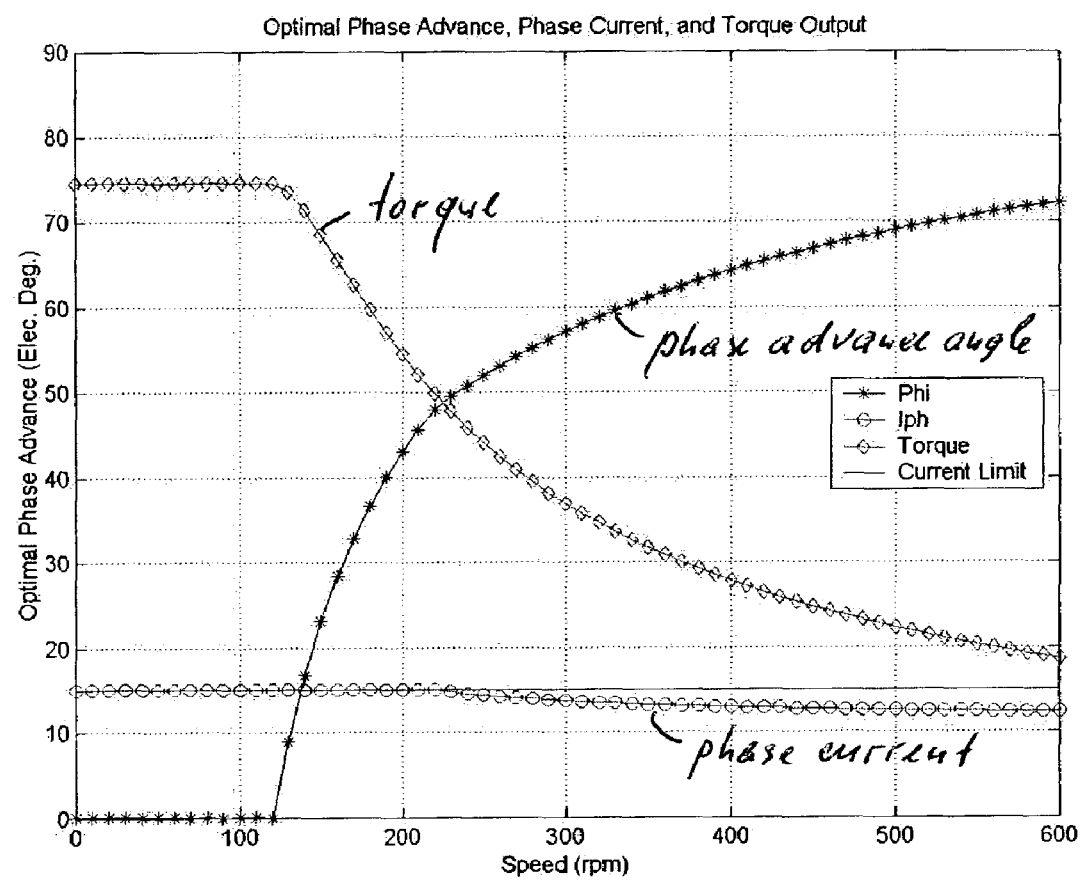
FIGS. 9 and 10 are diagrams illustrating phase advance angle optimization carried out by the first optimization section of FIG. 8.

FIG. 9 shows curves representing phase advance angle, phase current and torque output for a given speed, determined as a result of the optimization process carried out by first optimization section 82. As the motor parameters are phase dependent values, optimization is performed separately for each individual phase.

As shown in FIG. 9, the entire speed range may be divided into three regions, each of which has a distinct characteristic. In the low-speed region (e.g. below 120 rpm), the current rating constraint is dominant in limiting the torque output. The optimal phase advance angle is zero and the phase current equals the maximum current allowed.

In the medium-speed region (e.g. between 120 rpm and 220 rpm), both the maximum current and the DC power supply voltage constraints become active. Therefore, a positive phase advance is necessary to maximize the torque. Meanwhile, the phase current still equals the maximum current allowed. The torque output decreases as the speed increases, while the optimal phase advance angle increases with speed.

In the high-speed region (e.g. above 220 rpm), the DC power supply voltage becomes the dominant constraint. The maximum torque output continues to decrease and the phase advance continues to increase with speed. The phase current, however, is below the maximum allowed current.

Figure 10:
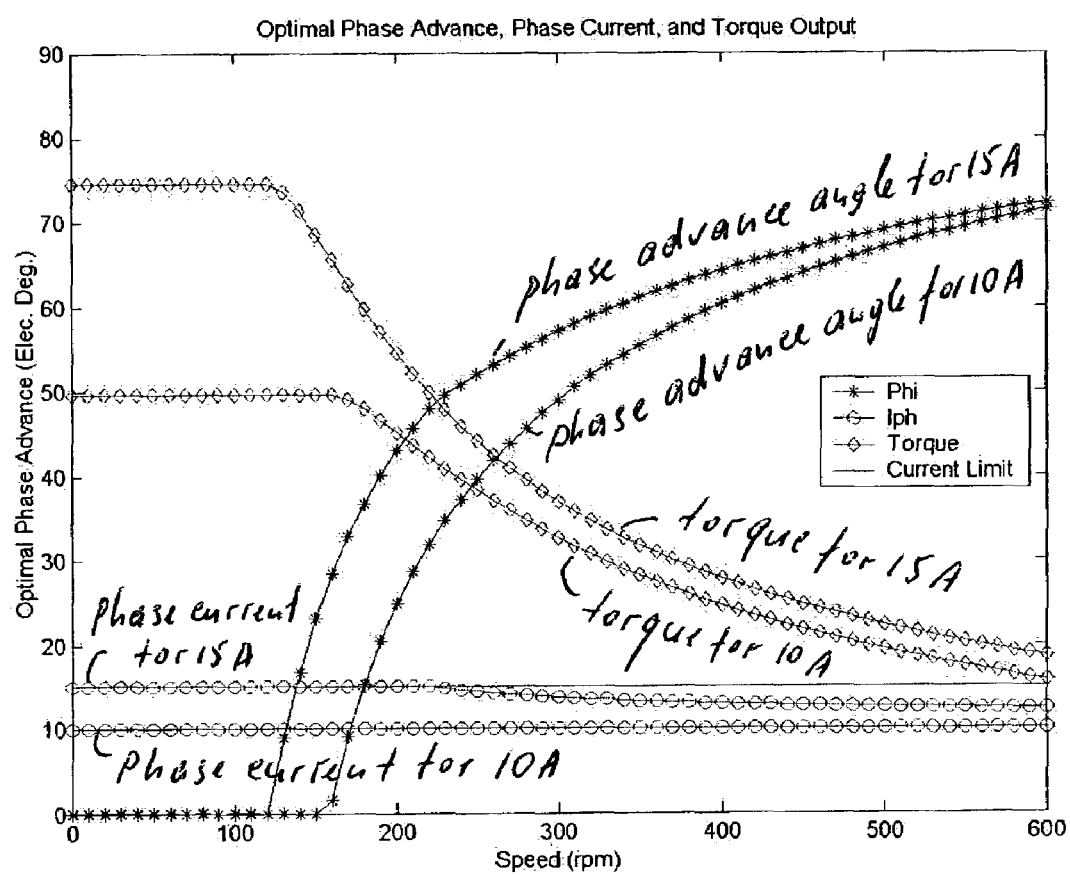

The first optimization process can be performed at various current ratings, resulting in a family of curves for optimal phase advance angle, phase current, and torque output. FIG. 10 illustrates curves representing phase advance angle, phase current and torque obtained at current ratings of 10A and 15A for a given speed.

Second optimization section 84 is supplied with the maximum torque value $T_{max}(\omega)$ determined by the first optimization section 82, together with the user requested torque command $T_{cmd}$ representing the desired torque. Based on these parameters, second optimization section 84 determines the optimal amplitude of phase current and the optimal phase advance angle for a given user requested torque command $T_{cmd}$ by minimizing the phase current $I_i$ for a particular speed and desired torque as follows:

Minimize $$I_i = \frac{2\min(T_{cmd}, T_{max}(\varpi))}{N_s K_{T,i} \cos(\alpha_i)} \quad (4)$$

subject to $$4(R_i^2 + X_{s,i}^2)T_{cmd}^2 + 4E_iN_sK_{r,i}T_{cmd}(-X_{s,i}\sin\alpha_i \cos\alpha_i + R_i \cos^2\alpha_i) + (E_i^2 - V_c^2)N_s^2K_{r,i}^2\cos^2\alpha_i \leq 0 \quad (5)$$

This is equivalent to minimizing the phase advance angle. As a result, the efficiency at the current speed and desired torque is maximized.

Hence, second optimization section 84 determines optimal values of phase current amplitude and phase advance angle in accordance with expressions (4) and (5).

Figure 11:
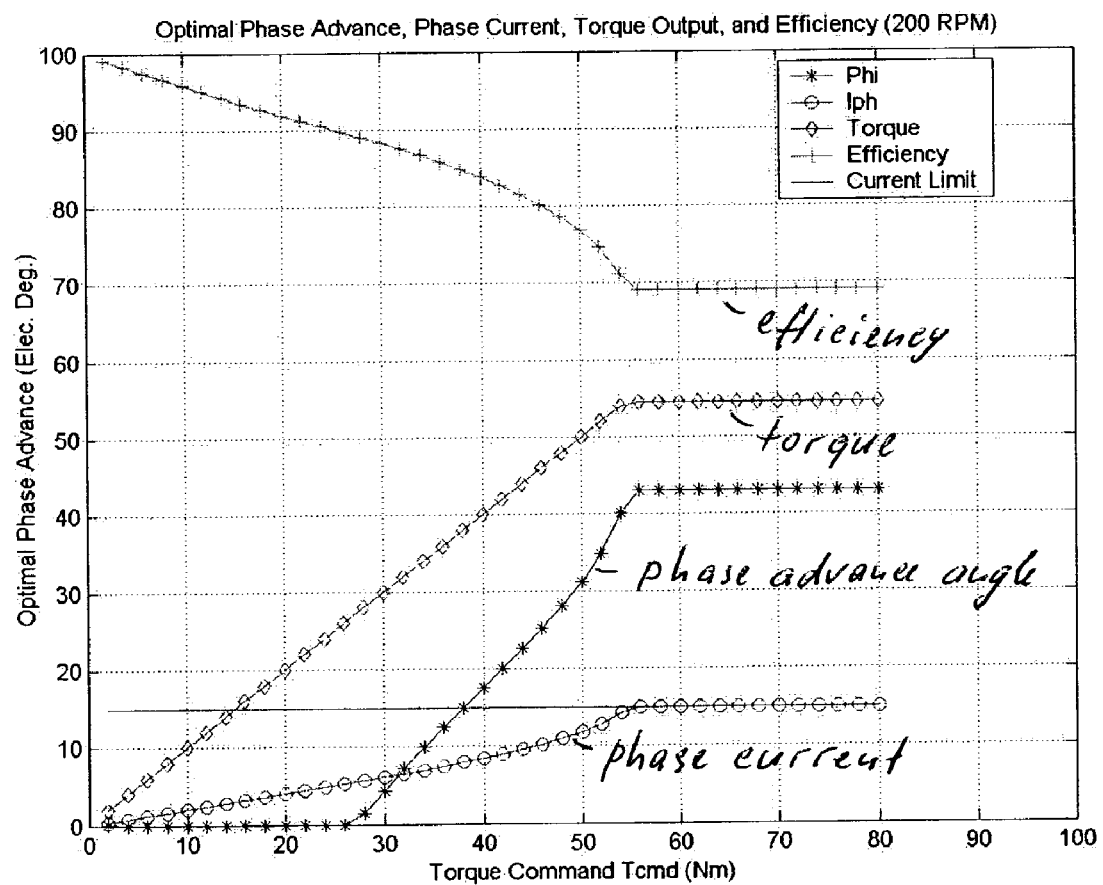
FIGS. 11 and 12 are diagrams illustrating phase advance angle optimization carried out by the second optimization section of FIG. 8.
Figure 12:
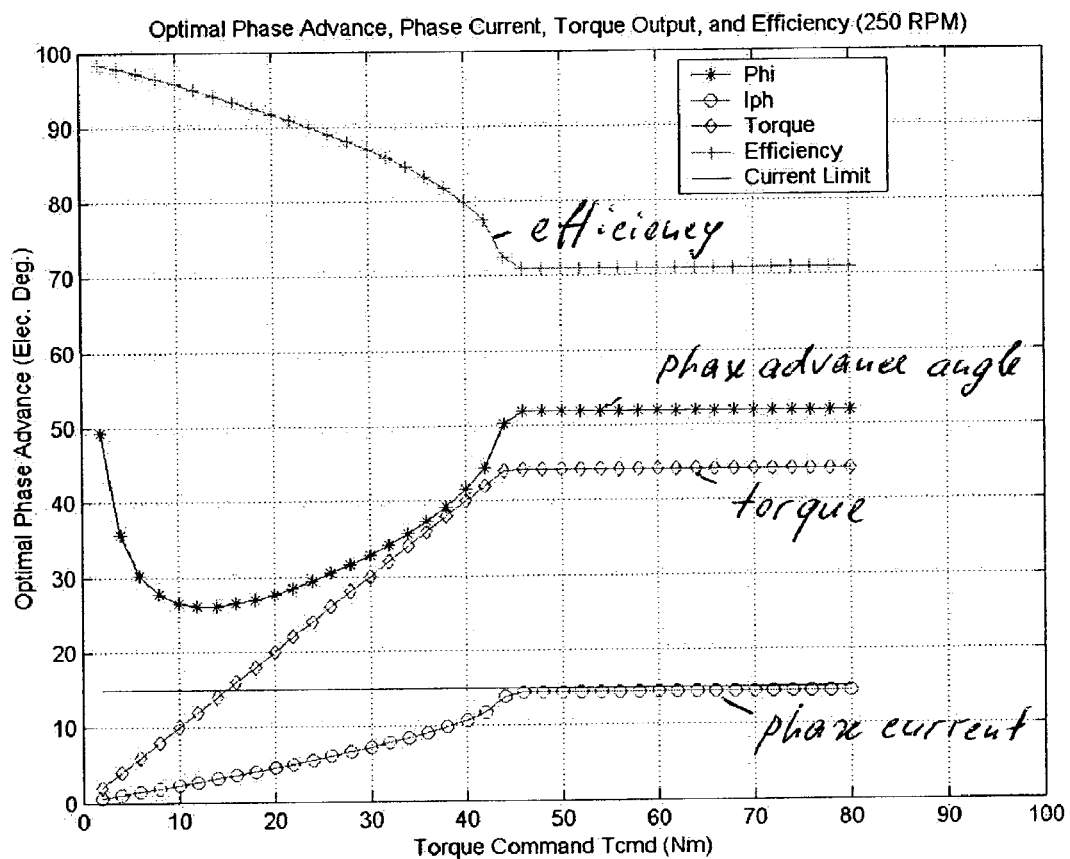

FIGS. 11 and 12 illustrate results of the optimization process for a given torque command $T_{cmd}$ at two speeds, 200 and 250 RPMs, respectfully. Similar to FIG. 9, the range of the user requested torque command $T_{cmd}$ in FIG. 11 can be divided into three regions. For lower torques (below 28 Nm), the requested torque can be achieved with zero phase advance angle. The same torque can also be achieved with a lower efficiency using a combination of positive phase advance and a higher current. In the intermediate region (between 28 and 56 Nm), the requested torque can be achieved with a positive phase advance angle. The same torque can also be achieved with a lower efficiency using a combination of a larger phase advance angle and a higher current. In the high torque region (above 56 Nm), the requested torque cannot be achieved. The maximum achievable torque is obtained using the optimization process carried out by first optimization section 82.

In accordance with an embodiment of the present invention, to support motor control in real-time, phase advance angle optimization block 61 is implemented as a 2-dimensional look-up table responsive to the motor speed and user requested torque command inputs to provide the optimal values of phase current amplitude and phase advance angle. Since the optimal values of phase current amplitude and phase advance angle are determined based on phase dependent parameters such as reactance of phase windings, torque coefficient and back-EMF, the optimization processes carried out by first and second optimization sections 82 and 84 may be performed for each phase to determine control signals $V_i$ (t) for respective phase windings. As a result, the phase advance angle optimization process of the present invention accounts for the parameter variations in the separate phase windings and stator phase component structures.

In operation, controller 44 successively outputs control signals $V_i$ (t) to the gate drivers for individual energization of respective phase windings. The gate drivers activate the respective switch sets so that the sequence in which windings are selected comports with a sequence established in the controller. The sequence is transmitted to the gate drivers through the link only generally illustrated in the diagram of FIG. 2. Each successive control signal $V_i$ (t) is related to the particular current sensed in the corresponding phase winding, the immediately sensed rotor position and speed, and also to model parameters, $K_{ei}$ and $K_{\tau i}$, that have been predetermined specifically for the respective phases. Thus, for each derived control signal $V_i(t)$, in addition to receiving timely sensed motor feedback signals, the controller must access the parameters specific to the particular phase to which the control signal corresponds. The controller thus has the ability to compensate for individual phase characteristic differences among the various stator phases. To prevent over/under compensation of the voltage control routine, the per-phase circuit parameters utilized are exactly matched to their actual values.

The per-phase torque coefficient $K_{\tau i}$ captures the per-phase torque contribution of each phase. This parameter is proportional to the ratio of the effective torque generated per current applied for that phase. The torque developed by the phase is a function of the magnetic flux density developed in the core material of the phase, which produces the effective air gap flux density. The design of the electromagnetic core geometry takes into account current density, which is a function of the ampere-turns on each portion of the core in order to optimize induction in the material without driving the core into saturation. However, the magnetic properties of the core material are often non-homogeneous throughout the stator core. If the motor is configured with separated, ferromagnetically autonomous electromagnet cores, inconsistencies can be even more pronounced. Variations in winding and inductance also contribute in determining the torque coefficient and the back-EMF coefficient parameters. There will be degradation in the effective flux buildup in the core if air pockets are formed in the windings. Although high packing factors can be achieved through uniform winding, there can be variations in wire manufacturing. Thus, if a nominal motor torque coefficient and a nominal back-EMF coefficient are utilized by the controller, the variation in properties of the phases produces overall motor output torque variations. The torque controller methodology represented in FIG. 7 avoids this problem by applying the per-phase torque coefficient and back-EMF coefficient predetermined for each phase.

The computations illustrated in FIG. 7 are performed successively in real time. The expression shown in block 62 has been selected to provide the desired currents for tracking torque in the preferred embodiment. This expression can be modified if factors other than precisely tracking changes in torque input commands are also of significance. For example, in some motor applications, degree of acceleration and deceleration may be of consideration to avoid unnecessarily rough operating conditions. The expression in block 62 thus can be changed to accommodate additional considerations.

Figure 1:
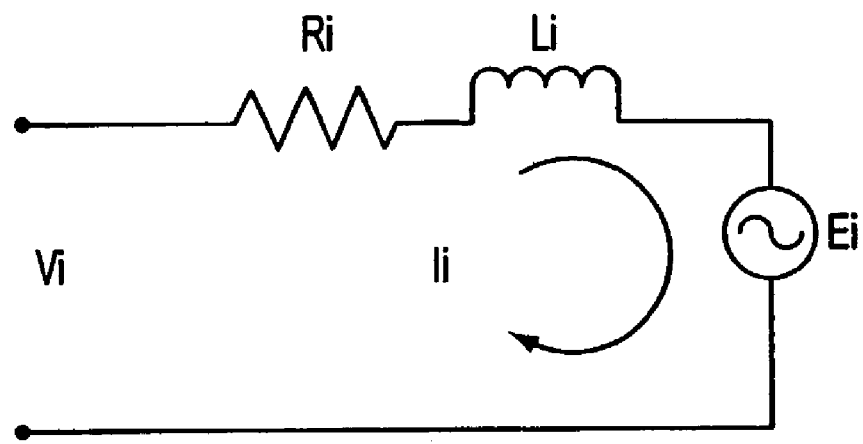
FIG. 1 is an equivalent circuit diagram for an individual motor phase.
Figure 13:
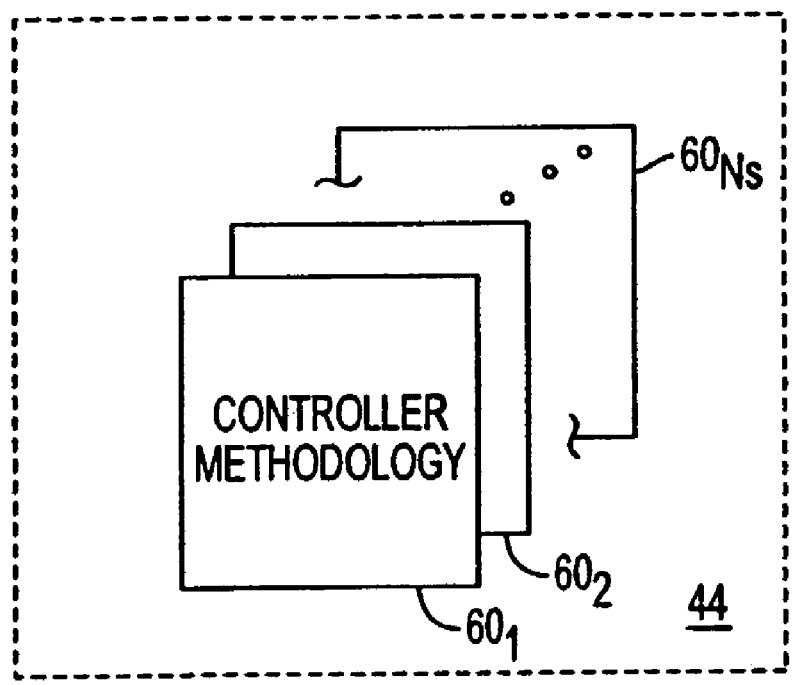
FIG. 13 is a partial block diagram that illustrates a variation of the controller methodology of FIG. 7.

The controller methodology illustrated in FIG. 7 may be performed in an integrated execution scheme in which particular phase parameters are substituted for each generated control voltage output. Alternatively, the controller 44 may provide a separate control loop for each stator phase, as represented in the partial block diagram of FIG. 13. For each of the $N_S$ motor phases, a corresponding control loop 60$_i$ is provided. Each loop contains the relevant parameters for the respective motor phase. The control loops are activated in accordance with the appropriate motor phase energization sequence and need only the sensed motor feedback signals for generation of the control voltages.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, in the control methodology illustrated in FIG. 7, the desired per-phase current $I_{di}$ (t) can be determined in real time from the received inputs of $T_{cmd}$, $\theta_i$ (t) by reference to values stored in look-up tables. Look-up tables would be provided for each stator phase. Alternatively, real-time optimization based on expressions (1)-(5) may be implemented, or optimization systems, such as artificial neural networks, may be used to obtain optimal control parameters.

As can be appreciated, the motor of the invention can be utilized in a wide range of applications in addition to vehicle drives. While it is preferred, in the implementation of a vehicle drive, that the rotor surround the stator, other applications may find advantageous utility with the stator surrounding the rotor. Thus, it is within the contemplation of the invention that each inner and outer annular member may comprise either the stator or rotor and may comprise either the group of electromagnets or group of permanent magnets.

Although the invention is disclosed with an example of separated magnetic circuits for each electric phase of the motor, the invention is applicable to other motor arrangements such as motors containing a common magnetic path. Hence, it is to be understood that the invention is capable of changes and modifications within the scope of the inventive concept as expressed herein.

What is claimed is:

1. A control system for a multiphase motor having a plurality of stator phase components and a rotor, each stator phase component comprising a phase winding formed on a core element, said system comprising: a controller for producing a control signal to energize the phase winding including: a current value determining mechanism for determining a value of phase current advanced in phase with respect to back-EMF by a phase advance angle, and a phase advance optimization mechanism for producing a value of the phase advance angle optimized so as to maximize output torque of the motor and minimize the phase current, wherein said phase advance optimization mechanism comprises a first optimization section for determining a maximum torque value for a given speed.

2. A control system as recited in claim 1, wherein said phase advance optimization mechanism is configured for optimizing the phase advance angle for each phase of the motor.

3. A control system as recited in claim 2, wherein said controller is configured with a separate control loop for each stator phase, each phase loop configuration utilizing an optimum value of the phase advance angle for a particular phase to generate the control signal for the respective phase winding.

4. A control system for a multiphase motor having a plurality of stator phase components and a rotor, each stator phase component comprising a phase winding formed on a core element, said system comprising:

a controller for producing a control signal to energize the phase winding including:

a current value determining mechanism for determining a value of phase current advanced in phase with respect to back-EMF by a phase advance angle, and a phase advance optimization mechanism for producing a value of the phase advance angle optimized so as to maximize output torque of the motor and minimize the phase current, wherein the core element of each stator phase component comprises a ferromagnetically isolated stator electromagnet, the electromagnet core elements being separated from direct contact with each other, and a phase winding formed on each core element.

5. A control system as recited in claim 1, wherein said phase advance optimization mechanism further comprises a second optimization section responsive to the maximum torque value for producing an optimum value of the phase advance angle.

6. A control system as recited in claim 5, wherein said second optimization section further produces optimum amplitude of the phase current.

7. A control system as recited in claim 6, wherein said second optimization section is configured to minimize the phase current for a given speed and user's requested torque.

8. A control system for multiphase motor, comprising: a control voltage calculator for determining a control voltage required to energize a phase winding of the motor in order to obtain a desired torque, a current calculator for determining per-phase current representing the desired torque, the per-phase current being advanced in phase with respect to back-EMF by a phase advance angle, and a phase advance determination mechanism responsive to a torque command signal corresponding to the desired torque to determine a per-phase value of the phase advance angle, wherein the phase advance angle is determined based on phase-dependent parameters and wherein the phase-dependent parameters include a phase-dependent torque coefficient.

9. A control system as recited in claim 8, wherein the phase advance determination mechanism is configured to maximize output torque of the motor and minimize the per-phase current for a given desired torque.

10. A control system as recited in claim 8, wherein the phase-dependent parameters include a phase-dependent back-EMF associated with each phase.

11. A control system as recited in claim 8, wherein the phase-dependent parameters include reactance of the phase winding.

12. A method for real-time control of a multi-phase motor having a plurality of stator phase windings, each winding formed on a core element, and a rotor, the method comprising the steps of:

inputting a torque command signal representing desired torque, determining phase current required to achieve the desired torque, based on the phase current, determining control voltage required to energize each winding in order to obtain the desired torque, advancing phase of the phase current with respect to back-EMF by a phase advance angle if the required control voltage exceeds power supply voltage, and based on the desired torque, determining the phase advance angle optimized to maximize output torque of the motor and minimize the phase current, wherein the step of optimizing comprises a first optimization step of determining a maximum torque value for a given speed.

13. A method as recited in claim 12, wherein the phase advance angle is optimized for each phase of the motor.

14. A method as recited in claim 12, wherein the step of optimizing further comprises a second optimization step of producing an optimum value of the phase advance angle in response to the maximum torque value.

15. A method as recited in claim 14, wherein said second optimization step further produces an optimum amplitude of the phase current.

16. A method as recited in claim 13, wherein the phase advance angle is optimized based on phase-dependent parameters.

17. A method as recited in claim 16, wherein the phase-dependent parameters include a phase-dependent torque coefficient.

18. A method as recited in claim 16, wherein the phase-dependent parameters include a phase-dependent back-EMF associated with each phase.

19. A method as recited in claim 16, wherein the phase-dependent parameters include reactance of phase winding.

20. A control system as recited in claim 4, wherein said phase advance optimization mechanism is configured for optimizing the phase advance angle for each phase of the motor.

21. A control system as recited in claim 20, wherein said controller is configured with a separate control loop for each stator phase, each phase loop configuration utilizing an optimum value of the phase advance angle for a particular phase to generate the control signal for the respective phase winding.

22. A method for real-time control of a multi-phase motor having a rotor, and a plurality of stator phase windings formed on core elements having ferromagnetically isolated stator electromagnets, the core elements being separated from direct contact with each other, the method comprising the steps of:

inputting a torque command signal representing desired torque, determining phase current required to achieve the desired torque, based on the phase current, determining control voltage required to energize each winding in order to obtain the desired torque, advancing phase of the phase current with respect to back-EMF by a phase advance angle if the required control voltage exceeds power supply voltage, and based on the desired torque, determining the phase advance angle optimized to maximize output torque of the motor and minimize the phase current.

23. A method as recited in claim 22, wherein the phase advance angle is optimized for each phase of the motor.

24. A control system for a multiphase motor having a plurality of stator phase components and a rotor, each stator phase component comprising a phase winding formed on a core element, said system comprising:

a controller for producing a control signal to energize the phase winding including:

a current value determining mechanism for determining a value of phase current advanced in phase with respect to back-EMF by a phase advance angle, a phase advance optimization mechanism for producing a value of the phase advance angle optimized so as to maximize output torque of the motor and minimize the phase current, wherein said phase advance optimization mechanism comprises a first optimization section for determining a maximum torque value for a given speed; and a difference mechanism to determine the difference between the value of the phase current and a sensed phase current.

25. A control system as recited in claim 24, wherein said phase advance optimization mechanism is configured for optimizing the phase advance angle for each phase of the motor.

26. A control system as recited in claim 25, wherein said controller is configured with a separate control loop for each stator phase, each phase loop configuration utilizing an optimum value of the phase advance angle for a particular phase to generate the control signal for the respective phase winding.

27. A control system as recited in claim 24, wherein the core element of each stator phase component comprises a ferromagnetically isolated stator electromagnet, the electromagnet core elements being separated from direct contact with each other, and a phase winding formed on each core element.

28. A control system as recited in claim 24, wherein said phase advance optimization mechanism further comprises a second optimization section responsive to the maximum torque value for producing an optimum value of the phase advance angle.

29. A control system as recited in claim 28, wherein said optimization section further produces optimum amplitude of the phase current.

30. A control system as recited in claim 29, wherein said second optimization section is configured to minimize the phase current for a given speed and user's requested torque.

31. A control system for a multiphase motor, comprising:
a control voltage calculator for determining a control voltage required to energize a phase winding of the motor in order to obtain a desired torque,
a current calculator for determining per-phase current representing the desired torque, the per-phase current being advanced in phase with respect to back-EMF by a phase advance angle,
a phase advance determination mechanism responsive to a torque command signal corresponding to the desired torque to determine a per-phase value of the phase advance angle, wherein the phase advance angle is determined based on phase-dependent parameters and wherein the phase-dependent parameters include a phase-dependent torque coefficient; and
a phase current difference calculator for determining the difference between the determined per-phase current and a sensed phase current, wherein the phase advance determination mechanism is configured to maximize output torque of the motor and minimize the per-phase current for a given desired torque.

32. A control system as recited in claim 31, wherein the phase-dependent parameters include a phase-dependent back-EMF associated with each phase.

33. A control system as recited in claim 31, wherein the phase-dependent parameters include reactance of the phase winding.

* * * * *